United States Patent
Artan et al.

(10) Patent No.: US 9,652,851 B2
(45) Date of Patent: May 16, 2017

(54) SIDE WINDOW DETECTION IN NEAR-INFRARED IMAGES UTILIZING MACHINE LEARNING

(71) Applicant: Xerox Corporation, Norwalk, CT (US)

(72) Inventors: Yusuf Artan, Rochester, NY (US); Peter Paul, Penfield, NY (US)

(73) Assignee: Conduent Business Services, LLC, Dallas, TX (US)

( * ) Notice: Subject to any disclaimer, the term of this patent is extended or adjusted under 35 U.S.C. 154(b) by 583 days.

(21) Appl. No.: 14/242,051

(22) Filed: Apr. 1, 2014

(65) Prior Publication Data

US 2015/0279036 A1    Oct. 1, 2015

(51) Int. Cl.
    *G06K 9/00*    (2006.01)
    *G06T 7/00*    (2017.01)
    (Continued)

(52) U.S. Cl.
    CPC ........ *G06T 7/0046* (2013.01); *G06K 9/00771* (2013.01); *G06K 9/00832* (2013.01);
    (Continued)

(58) Field of Classification Search
    CPC ........... G06K 9/00221; G06K 9/00228; G06K 9/00362; G06K 9/00369; G06K 9/00832;
    (Continued)

(56) References Cited

U.S. PATENT DOCUMENTS

| 6,768,420 B2 | 7/2004 | McCarthy et al. |
| 8,358,808 B2 | 1/2013 | Malinovskiy et al. |

(Continued)

FOREIGN PATENT DOCUMENTS

EP    2 602 640 A1    6/2013

OTHER PUBLICATIONS

Ioannis Pavlidis, Vassilios Morellas, and Nikolaos Papanikolopoulos, "A Vehicle Occupant Counting System Based on Near-Infrared Phenomenology and Fuzzy Neural Classification", IEEE, Transactions on Intelligent Transportation Systems, vol. 1, No. 2, Jun. 200, pp. 72-85.*

(Continued)

*Primary Examiner* — Eric Rush
(74) *Attorney, Agent, or Firm* — Kermit D. Lopez; Luis M. Ortiz; Ortiz & Lopez, PLLC

(57) ABSTRACT

Methods, systems and processor-readable media for side window detection in near-infrared (NIR) images utilizing machine learning. An image-capturing unit can capture an image/video in a near-infrared (NIR) band via a side window of an incoming vehicle. A deformable part model can be generated utilizing a side window detection and B-frame detection in order to obtain a set of candidate side-windows. Side window detection can be performed based on a mixture of a tree model and a shared pool and can be globally optimized with dynamic programming and still-capture to detect the backseat side window boundary utilizing a B-pillar. A false alarm with respect to the deformable part model can be removed utilizing a super pixel generation and a longest-line detection unit in order to generate a refined deformable part model.

20 Claims, 11 Drawing Sheets

(51) Int. Cl.
G06K 9/62 (2006.01)
G06N 99/00 (2010.01)
G06N 5/02 (2006.01)

(52) U.S. Cl.
CPC ....... *G06K 9/00838* (2013.01); *G06K 9/6204* (2013.01); *G06K 9/6206* (2013.01); *G06T 7/0089* (2013.01); *G06K 9/00228* (2013.01); *G06K 9/6207* (2013.01); *G06N 5/025* (2013.01); *G06N 99/005* (2013.01); *G06T 2207/10016* (2013.01); *G06T 2207/10048* (2013.01); *G06T 2207/20072* (2013.01); *G06T 2207/20081* (2013.01); *G06T 2207/20152* (2013.01); *G06T 2207/30201* (2013.01); *G06T 2207/30232* (2013.01); *G06T 2207/30236* (2013.01); *G06T 2207/30248* (2013.01); *G06T 2207/30268* (2013.01)

(58) Field of Classification Search
CPC .............. G06K 9/00838; G06K 9/6204; G06K 9/6206; G06T 5/50; G06T 7/004; G06T 7/0046; G06T 7/0079; G06T 7/0085; G06T 7/0089; G06T 2207/30248; G06T 2207/30268; B60N 2/002
USPC ....... 382/100, 104, 159, 181, 199, 209, 215, 382/224, 226, 227, 254, 266, 299; 348/148, 149
See application file for complete search history.

(56) References Cited

U.S. PATENT DOCUMENTS

| | | | |
|---|---|---|---|
| 8,362,911 B2 | 1/2013 | Kolb et al. | |
| 8,493,237 B2 | 7/2013 | Grievink et al. | |
| 8,517,316 B2 | 8/2013 | Baldwin et al. | |
| 8,520,074 B2* | 8/2013 | Wang | G06K 9/00369 382/192 |
| 8,596,587 B2 | 12/2013 | Hilleary | |
| 8,599,257 B2 | 12/2013 | Takahashi | |
| 8,913,783 B2* | 12/2014 | Khan | G06K 9/00651 382/103 |
| 9,477,881 B2* | 10/2016 | Konishi | G06K 9/00369 |
| 2009/0309974 A1* | 12/2009 | Agrawal | G08G 1/04 348/159 |
| 2012/0069183 A1* | 3/2012 | Aoki | G06K 9/00771 348/148 |
| 2013/0147959 A1 | 6/2013 | Wang et al. | |
| 2013/0278768 A1 | 10/2013 | Paul et al. | |
| 2013/0341468 A1 | 12/2013 | Baldwin et al. | |
| 2015/0278617 A1* | 10/2015 | Oami | G06K 9/00838 382/103 |

OTHER PUBLICATIONS

Kosecka, J. et al., "Video Compass," ECCV '02 Proceedings of the 7th European Conference on Computer Vision—Part IV (2002) Springer-Verlag, London, pp. 476-490.

Shechtman, E. et al., "Matching Local Self-Similarities across Images and Videos," Computer Vision and Pattern Recognition, CVPR '07 IEEE Conference Jun. 17-22, 2007, Minneapolis, MN, pp. 1-8.

Zhu, X. et al., "Face Detection, Pose Estimation, and Landmark Localization in the Wild," Computer Vision and Pattern Recognition (CVPR), 2012 IEEE Conference on Biometrics Compendium, Jun. 16-21, pp. 2879-2886, Providence, RI.

\* cited by examiner

SIDE WINDOW DETECTION IN NEAR-INFRARED IMAGES UTILIZING MACHINE LEARNING

FIELD OF THE INVENTION

Embodiments are generally related to HOV (High Occupancy Vehicle) and HOT (High Occupancy Toll) lanes and systems and traffic management. Embodiments are also related to the field of vehicle occupancy detection. Embodiments are additionally related to the field of machine learning. Embodiments are further related to the detection of a side window in near-infrared (NIR) images.

BACKGROUND

With the increasing demand for security and safety, video-based surveillance systems are being increasingly utilized in urban locations. Vast amounts of video footage can be collected and analyzed for traffic violations, accidents, crime, terrorism, vandalism, and other activities. Since manual analysis of such large volumes of data is prohibitively costly, there is a pressing need to develop an effective tool that can aid in the automatic or semi-automatic interpretation and analysis of such video data for surveillance and law enforcement among other activities.

The ability to efficiently and easily detect managed lane violations in HOV/HOT lanes has aroused considerable interest. Conventionally, managed lane regulations are enforced by a law enforcement officer via manual observations. Unfortunately, this practice is expensive and more importantly, not very effective. In one conventional approach, for example, a camera-based system is employed to determine the number of persons within a vehicle utilizing a front and a side-view camera placed on or near a toll gantry. The field of view of the side camera captures rear seat passengers while the field of view of the front view camera captures front seat passengers. Such an approach does not automatically count the number of passengers in the rear seat and is not robust against variations of window types.

Based on the foregoing, it is believed that a need exists for an improved side window detection approach with respect to NIR images utilizing machine learning, as will be discussed in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved occupancy detection methods, systems, and processor-readable media.

It is another aspect of the disclosed embodiments to provide for improved side window detection with respect to NIR images utilizing machine learning.

It is further aspect of the disclosed embodiments to provide for improved machine learning techniques that combine a deformable part model with a super pixel, a line detection and a local self-similarity based distance metric.

The aforementioned aspects and other objectives and advantages can now be achieved as described herein. Side window detection methods and systems in near-infrared (NIR) images utilizing machine learning is disclosed herein. An image-capturing unit can capture an image/video in a near-infrared (NIR) band via the side window of an incoming vehicle. A deformable part model can be utilized in side window detection and B-frame detection in order to obtain a set of candidate side-windows. The side window detection can be performed based on mixture of tree model(s) with a shared pool of part and can be globally optimized with dynamic programming and still-capture capabilities to detect the backseat side window boundary utilizing a B-pillar (i.e., a pillar between a front seat side window and a second row side window). A false alarm generated by the deformable part model can be removed utilizing a super pixel generation and a longest-line detection unit in order to generate a refined deformable part model. The detection performance of the deformable part model can be further refined based on global regional information utilizing a local self similarity based metric.

The side window detection and B-frame detection module can identify spatial features such as, for example, a face (or faces) associated with the presence of occupants. An elastic deformation and a 3D structure of an object can be encoded for face detection and pose estimation. The mixtures of trees (poses) with the shared pool of parts defined at each landmark position and global mixture can be employed to model a topological change due to view points. The global mixture can also be employed to capture a gross deformation change for a single viewpoint. The model can be considered as a linear classifier which generates a face detection score for the image regions, and a highest score can be typically assigned as the face region.

A longest line detection unit can compute an image derivative followed by a non-maximum suppression utilizing a canny edge detector. Next, a line can be fitted on a gradient image. The gradient direction can be quantized into a set of ranges, wherein all the pixels possess an orientation within a certain range that falls into a corresponding bin and are assigned a particular label. The edge pixels having similar label can be connected via a connected components analysis algorithm with length above a certain threshold (in terms of pixels). Next, the binary line image in the X direction (see, for example, FIG. 8) can be summed and low pass filtering of one-dimensional line sum image can be performed. The longest line in the image that corresponds to the upper/lower side of the side windows can be employed for potential side-window detection.

The superpixels are small, closed image segments that possess coherent region features and their boundaries are perpendicular to an image gradient. The superpixels can be derived by applying a watershed transform to a grayscale side view image. The superpixel with the highest number of elements below the longest line typically corresponds to the body of the vehicle. The body of the vehicle is not considered for side-window detection unless the detection confidence score is high in order to reduce the false alarm rate.

The local self similarity based metric can be performed by adding a weighting term to the face detection score function in order to remove a homogenous false alarm region. The weighting term measures the local self similarity at every landmark point by correlating a local patch centered at landmark with a larger surrounding image region. Next, a sum of the chi-square distance between a histogram of a local and larger region can be computed. The weighting term can be incorporated into the deformable part model (DFM) inference and/or can be employed as a post processing step utilizing the detected landmark points. The local self similarity processing further eliminates false alarms due to a strong edge point.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
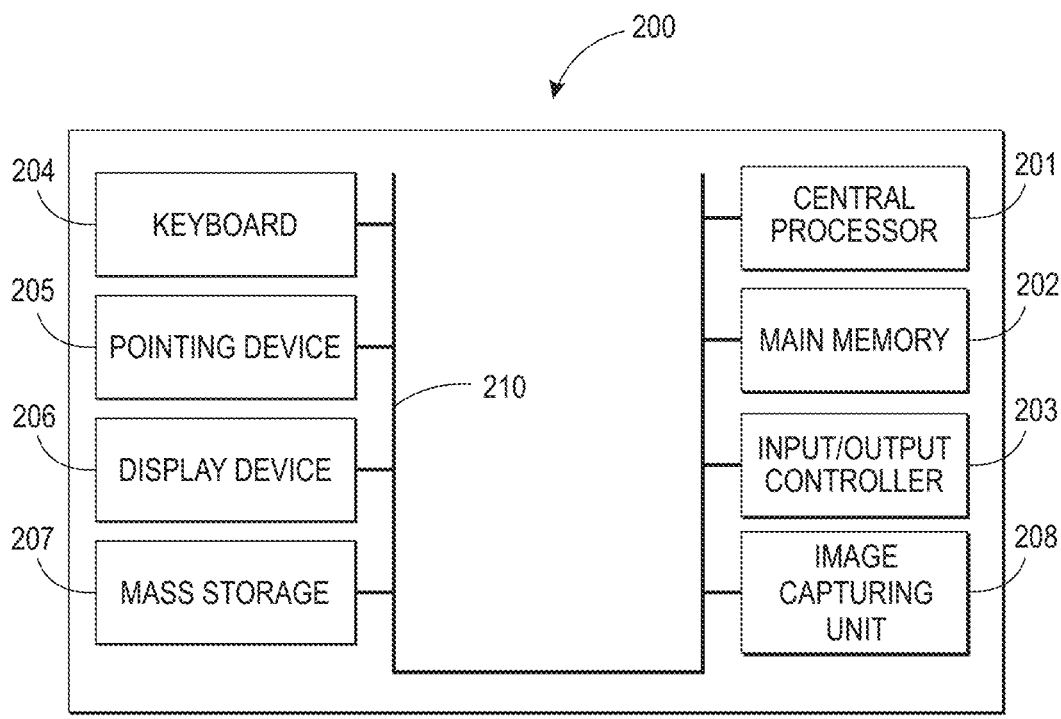
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the users computer, partly on the users computer, as a stand-alone software package, partly on the user's computer and partly on a remote computer or entirely on the remote computer. In the latter scenario, the remote computer may be connected to a users computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
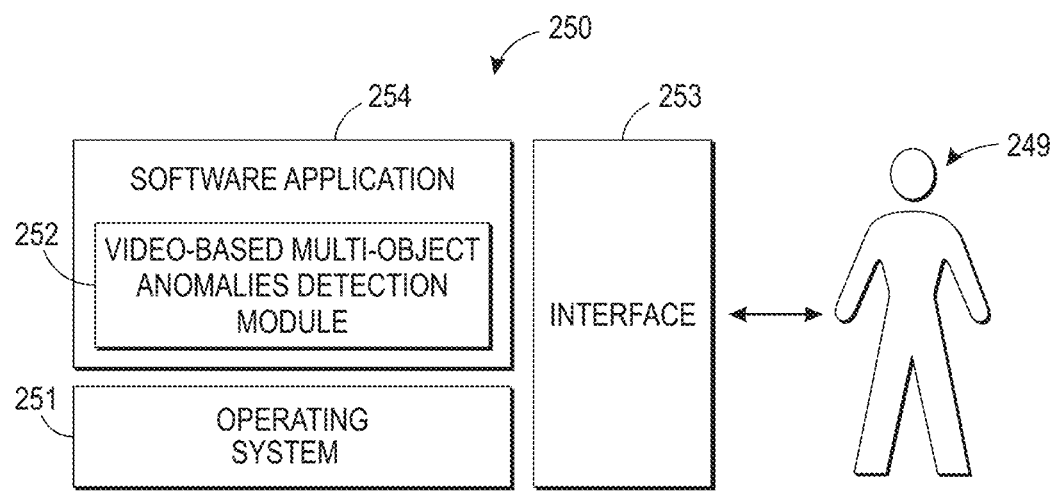
FIG. 2 illustrates a schematic view of a software system including a side window detection module, an operating system, and a user interface, in accordance with the disclosed embodiments.

FIGS. 1-2 are provided as exemplary diagrams of data-processing environments in which embodiments can be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As shown in FIG. 1, the disclosed embodiments may be implemented in the context of a data-processing system 200 that can include, for example, a central processor 201, a main memory 202, an input/output controller 203, a keyboard 204, an input device 205 (e.g., a pointing device such as a mouse, track ball, pen device, etc.), a display device 206, a mass storage 207 (e.g., a hard disk), and image capturing unit 208. As illustrated, the various components of data-processing system 100 can communicate electronically through a system bus 210 or other communications architecture. The system bus 210 may be, for example, a subsystem that transfers data between, for example, computer components within data-processing system 100 or to and from other data-processing devices, components, computers, etc.

FIG. 2 illustrates a computer software system 250 that can be implemented for directing the operation of the data-processing system 200 depicted in FIG. 1. Software application 254, stored in main memory 202 and on mass storage 207, generally includes, for example, a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253; these inputs may then be acted upon by the data-processing system 200 in accordance with instructions from operating system module 251 and/or software application 254.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 253, which is preferably a graphical user interface (GUI), can serve to display results, whereupon a user 249 may supply additional inputs or terminate a particular session. In some embodiments, operating system 251 and interface 253 can be implemented in the context of a "windows" system. It can be appreciated, of course, that other types of systems are possible. For example, rather than a traditional "windows" system, other operating systems such as, for example, a real time operating system (RTAS) more commonly employed in wireless systems may also be employed with respect to operating system 251 and interface 253. The software application 254 can include, for example, a vehicle side window detection module 252 for detecting a side window by combining a deformable part model 375 with a super pixel and local self similarity distance metric. The vehicle side window detection module 252 can include instructions such as those of method 400 discussed herein with respect to FIG. 4.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

Figure 3:
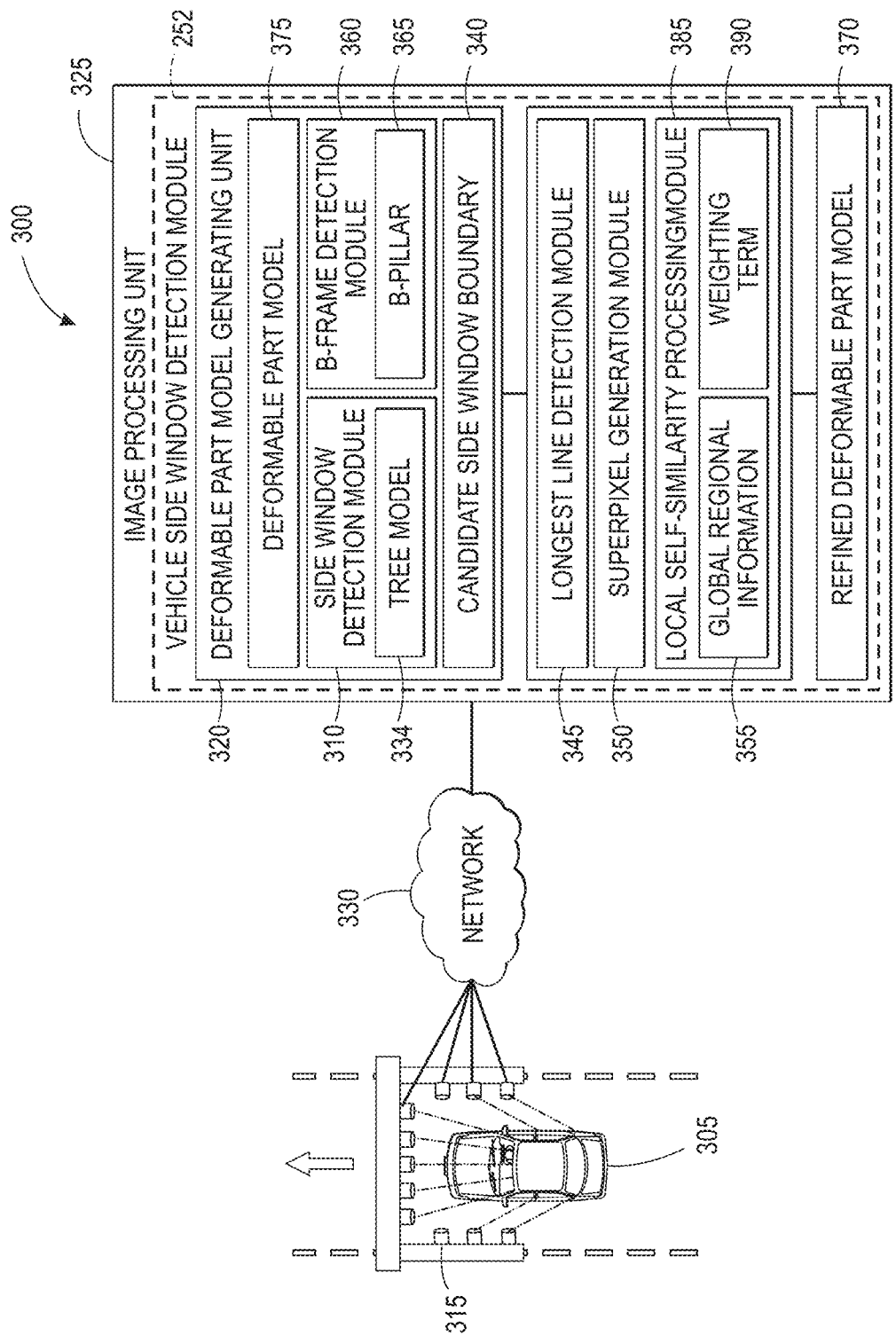
FIG. 3 illustrates a block diagram of a side window detection system in NIR image, in accordance with the disclosed embodiments.

FIG. 3 illustrates a block diagram of a side window detection system 300 in near-infrared (NIR) image, in accordance with the disclosed embodiments. The side window detection system 300 generally includes an image capturing unit 315 (e.g., camera) for capturing an image of a vehicle 305 within an effective field of view. The image capturing unit 315 can be employed to determine a number of persons inside the vehicle 305. The image capturing unit 315 captures an image/video of the vehicle 305 in the near-infrared (NIR) band via a side window of the vehicle 305. The image capturing unit 315 can be operatively connected to an image processing unit 325 via a network 330.

Note that the network 330 may employ any network topology, transmission medium, or network protocol. The network 330 may include connections such as wire, wireless communication links, or fiber optic cables. Network 330 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages.

Note that the image capturing unit 315 described in greater detail herein are analogous or similar to the image capturing unit 208 of the data-processing system 200, depicted in FIG. 1. The image capturing unit 315 may include integrated functions such as for example, image processing, data formatting and data compression functions. Also, the unit can include in some cases, imager-positioning, and range-finding components along with, for example, a flash bulb.

The side window detection system 300 can be configured to include the vehicle side window detection module 252 by combining the deformable part model 375 generating unit 320 with a superpixel generation module 350 and a local self similarity distance processing module 385. The deformable part model generating unit 320 generates a deformable part model 375 utilizing a side window detection module 310 and B-frame detection module 360 in order to obtain a set of candidate side-windows 340.

The side window detection module 310 detects the side window based on mixture of tree model 334 with a shared pool of part and globally optimize with a dynamic programming and still capture to detect the backseat side window boundary 340 utilizing a B-pillar 365 (a pillar between a front seat side window and a second row side window). The super pixel generation module 350 and a longest-line detection unit 345 remove a false alarm with respect to the deformable part model 375 in order to generate a refined deformable part model 370. The local self similarity based metric module 385 further refines the detection performance of the deformable part model 375 based on global regional information 355 and a weighting term 390.

The side window detection module 310 identifies spatial features such as a face that is associated with the presence of occupants. The side window detection module 310 encodes the elastic deformation and 3D structure of an object for face detection and poses estimation. The side window detection module 310 employs mixtures of trees (poses) 334 with a shared pool of parts defined at each landmark positions and utilizes global mixtures to model topological changes due to view points. The global mixture can also be employed to capture gross deformation changes for a single viewpoint. Each particular configuration of parts $L=\{l_i: i \in V\}$ for the given image/by a score function as shown in equations (1), (2) and (3) below:

$$S(I, L, m) = App_m(I, L) + Shape_m(L) + \alpha^m, \quad (1)$$

$$App_m(I, L) = \sum_{i \in V_m} w_i^m \cdot \phi(I, l_i) \quad (2)$$

$$Shape_m(L) = \sum_{ij \in E_m} a_{ij}^m dx^2 + b_{ij}^m dx + c_{ij}^m dy^2 + d_{ij}^m dy \quad (3)$$

wherein S is a score as a function of the image being analyzed I, the one or more landmark points L tuned for a mixture m, $\phi(I,l_i)$ is the HoG (Histogram of Gradients) features extracted at location $I_i$, $App_m$ is a sum of appearance evidence for placing a template $w_i^m$ for a part tuned for the mixture m at a location $I_i$ of the image. $Shape_m$ is a score of a mixture specific spatial arrangement of parts L (dx and dy are the x-axis and y-axis displacements of part i with respect to part j, and parameters (a, b, c and d) specify the spatial cost constraints between pairs of parts i and j) or a geometric relationship between the one or more landmark points and $\alpha^m$ is a constant for the mixture m. $V_m$ represents a pool of parts belonging to the mixture m. $E_m$ represents a set of edges between the pool of parts in $V_m$.

This model can be considered as a linear classifier which generates side window detection scores for the image regions and the highest score is typically assigned as the side window region. During inference, equation (1), (2), and/or (3) can be maximized over L and m, as indicated by equation (4) below:

$$S*(I) = \max_m [\max_L S(I, L, m)] \quad (4)$$

Figure 4:
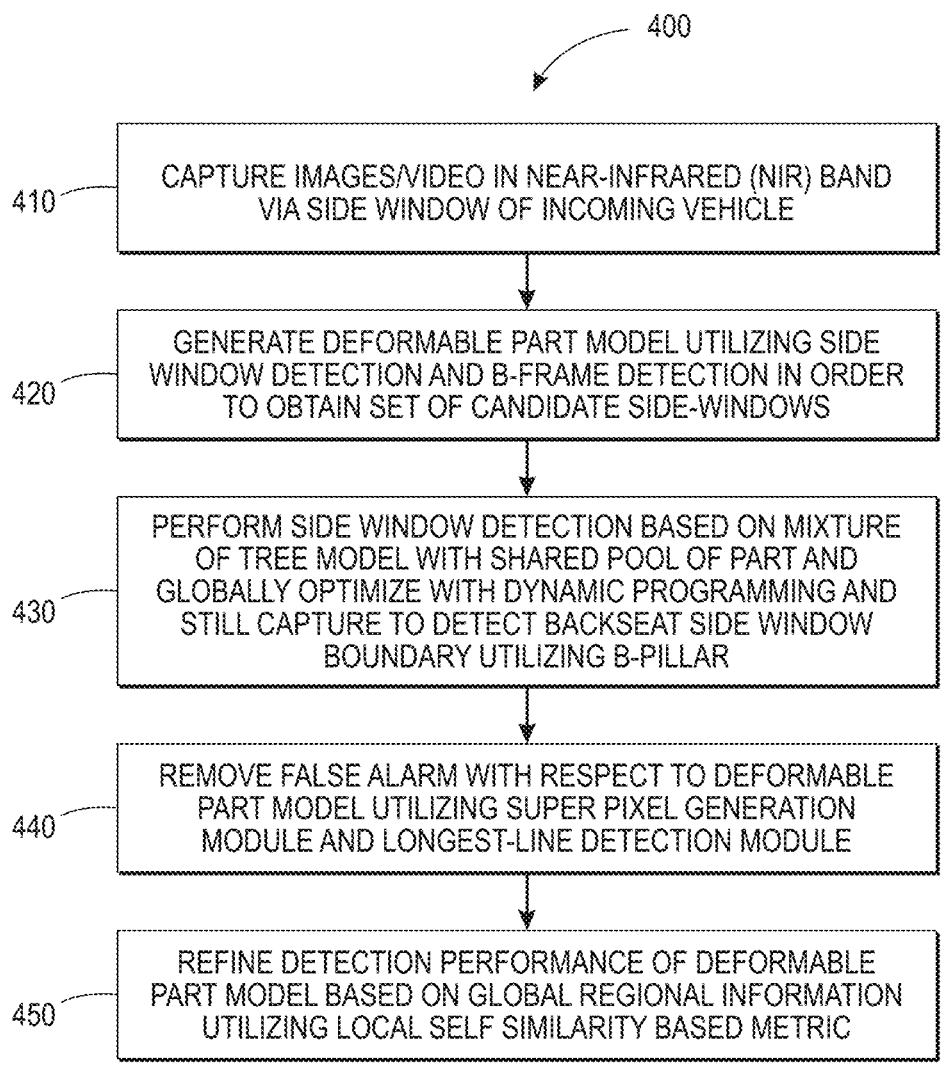
FIG. 4 illustrates a high level flow chart of operations illustrating logical operational steps of a method for detecting a side window by combining a deformable part model with a super pixel and local self similarity distance metric, in accordance with the disclosed embodiments.

FIG. 4 illustrates a high level flow chart of operations illustrating logical operational steps of a method 400 for detecting the side window by combining the deformable part model 375 with the super pixel and local self similarity distance metric 350 and 385, in accordance with the disclosed embodiments. Initially, as indicated at block 410, the image capturing unit 315 captures an images/video in the near-infrared (NIR) band via the side window of the incoming vehicle 305. The deformable part model 375 can be generated utilizing the side window detection and B-frame detection module 310 and 360 in order to obtain the set of candidate side-windows 340, as depicted at block 420.

The side window detection can be performed based on mixture of tree model 334 with the shared pool of part and can be globally optimized with the dynamic programming and capture the backseat side window boundary 340 utilizing the B-pillar 365, as shown at block 430. The false alarm with respect to the deformable part model 375 can be removed utilizing the super pixel generation module 350 and the longest-line detection unit 345 in order to generate the refined deformable part model 370, as illustrated at block 440. The detection performance of the deformable part model 375 can be further refined based on global regional information 355 utilizing the local self similarity based metric, as shown at block 450.

Figure 5:
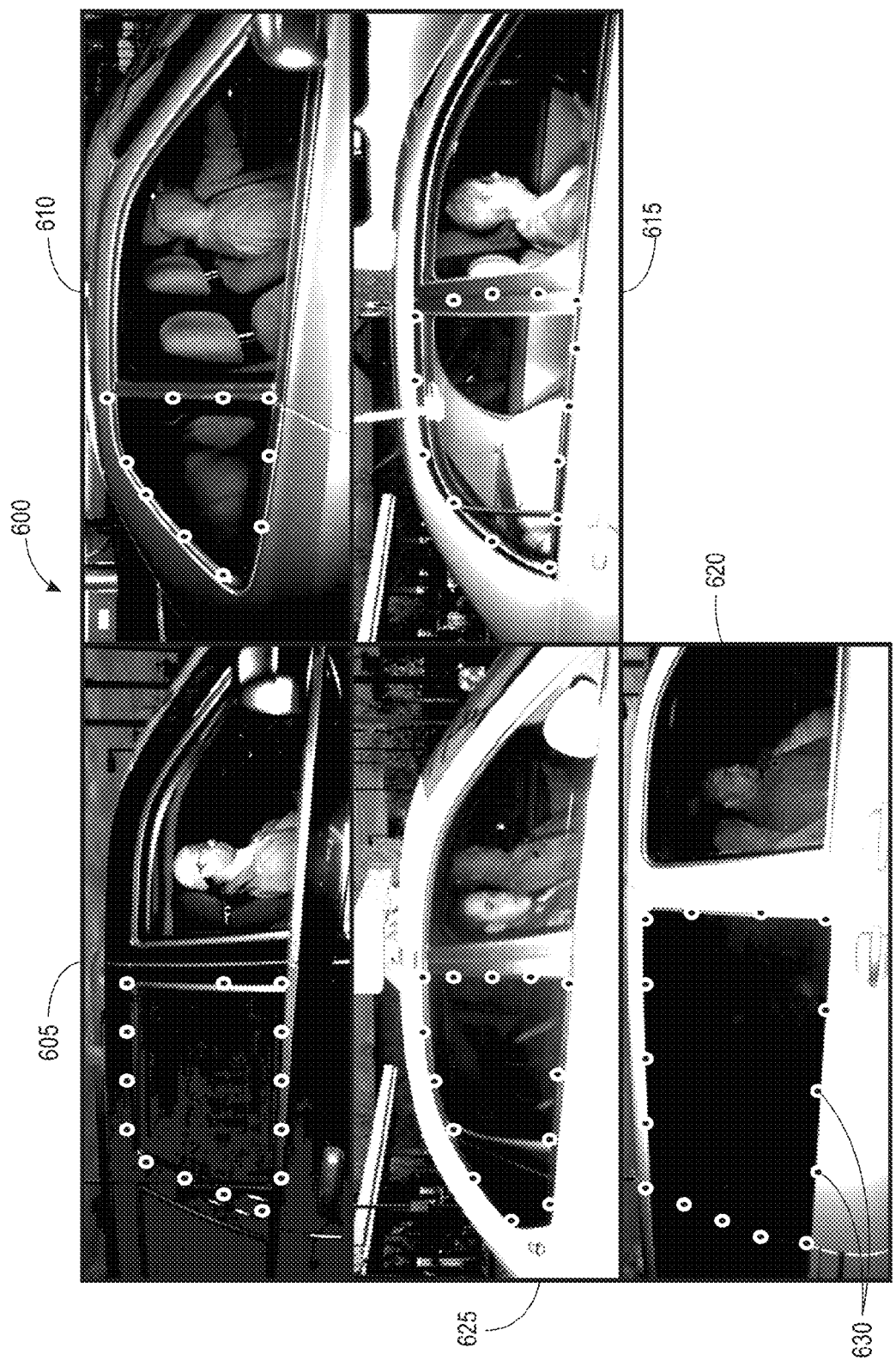
FIG. 5 illustrates a vehicle image depicting mixture of trees model that encodes a topological structure of various side-window type via position information of a landmark point, in accordance with the disclosed embodiments.

FIG. 5 illustrates a vehicle image depicting mixture of trees model 600 that encodes topological structures of various side-window type via position information of landmark points, in accordance with the disclosed embodiments. The side window detection method 400 works accurately on a broad range of vehicles. The mixture of trees model 600 encodes topological structures of various side-window type 605, 610, 615, 620, and 625 via the position information of landmark points 630. During training, 50 images are utilized from 5 different side-window types (10 images per side window type) as shown in FIG. 5. Note that number of mixtures can be easily extended for a more comprehensive dataset. In the training stage, an appearance and shape model for landmark point for each mixture component can be learnt as shown in FIG. 6

Figure 6:
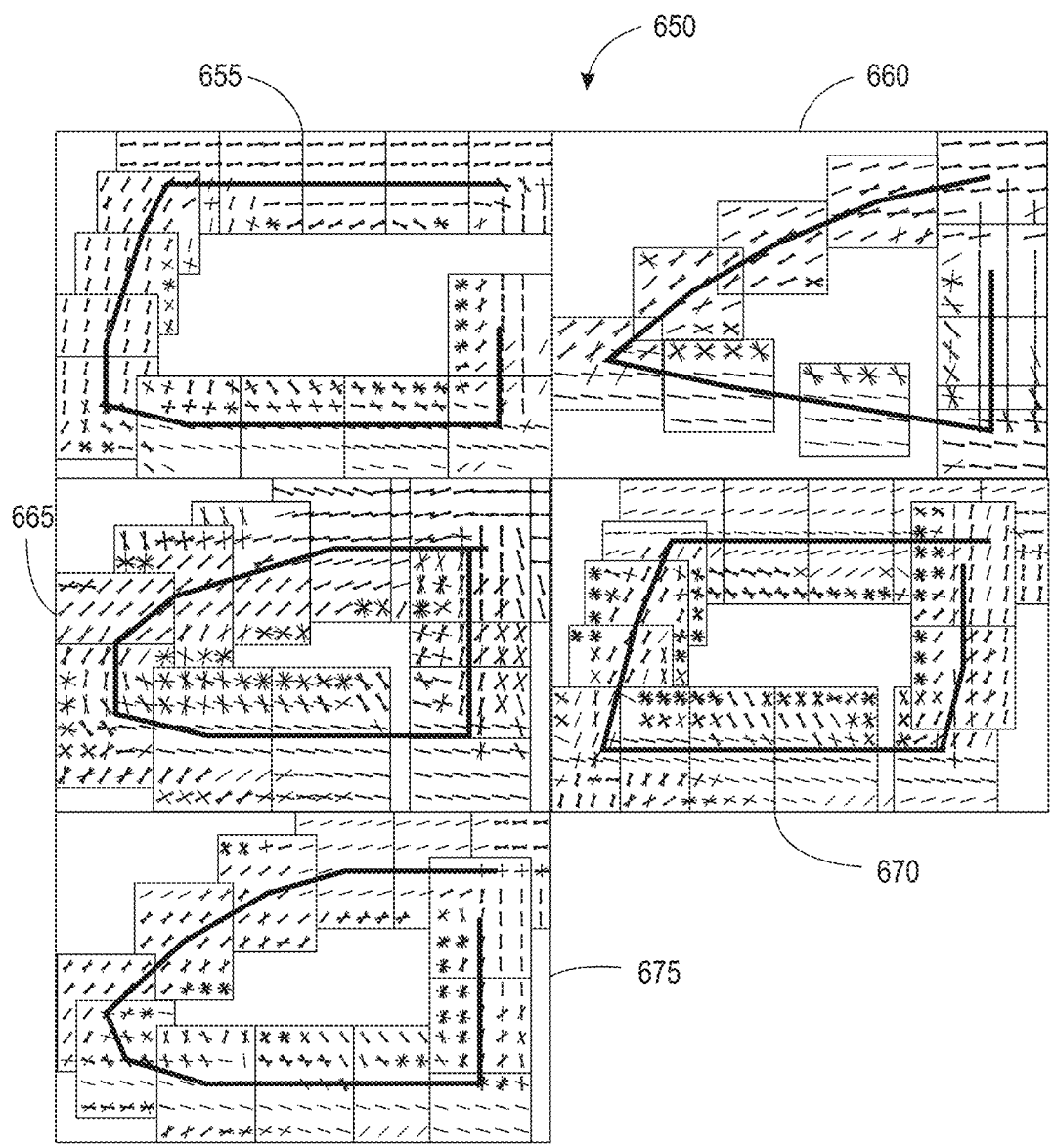
FIG. 6 illustrates a vehicle image depicting Histogram of Gradient (HOG) model for each landmark point and a shape model between neighboring landmark points that are learnt during a training stage, in accordance with the disclosed embodiments.
Figure 7:
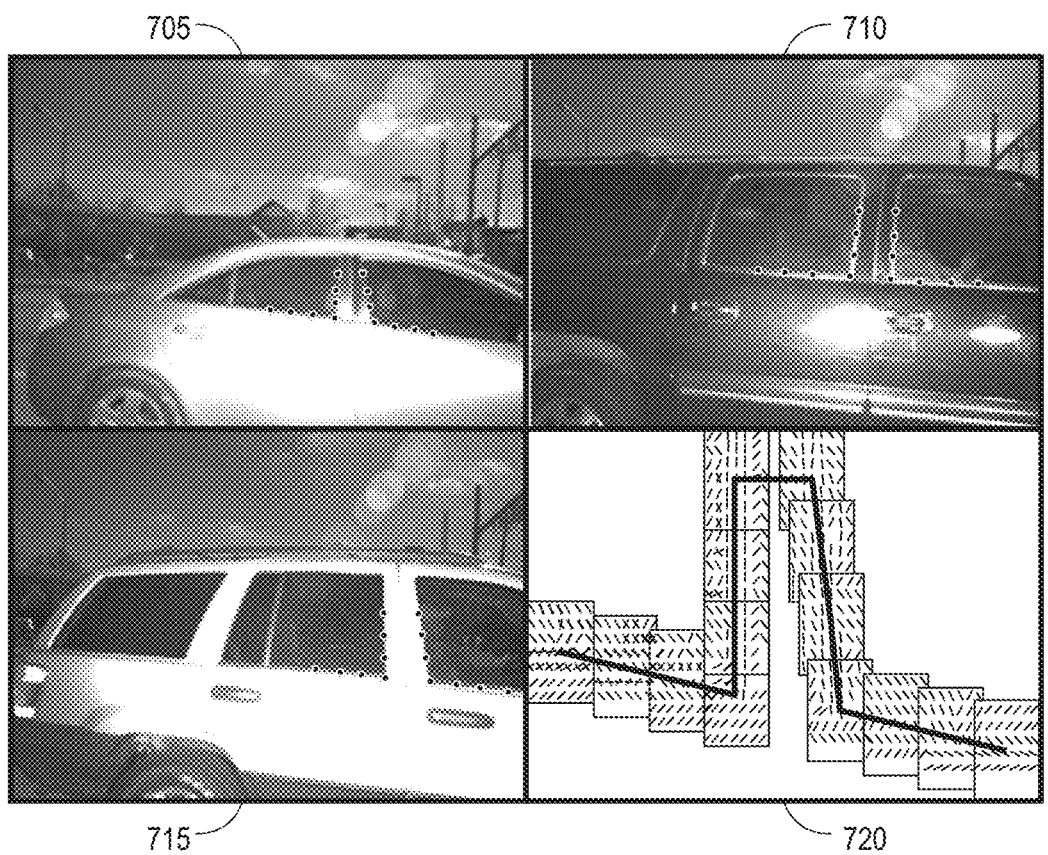
FIG. 7 illustrates a vehicle image showing a set of landmark points for B-frame detection and HOG models as well as a shape (spatial) model for tree model, in accordance with the disclosed embodiments.

FIG. 6 illustrates Histogram of Gradient (HOG) model 650 for each landmark point and shape model between neighboring landmark points learnt during the training stage. The parts 655, 660, 665, 670, and 675 denote the models learned for side-windows of type shown in FIG. 5. Next, the deformable part model 375 can be generated for the detection of B-frame to capture side-window boundary 340 more precisely and to discard the false alarms generated by the driver side window. FIG. 7 illustrates B-frame sample images with training points overlaid and trained deformable part model 375 obtained using 15 images. The part 705, 710, and 715 represents a set of landmark points for B-frame detection. The part 720 illustrates the HOG models as well as the shape (spatial) model for tree model.

Figure 8:
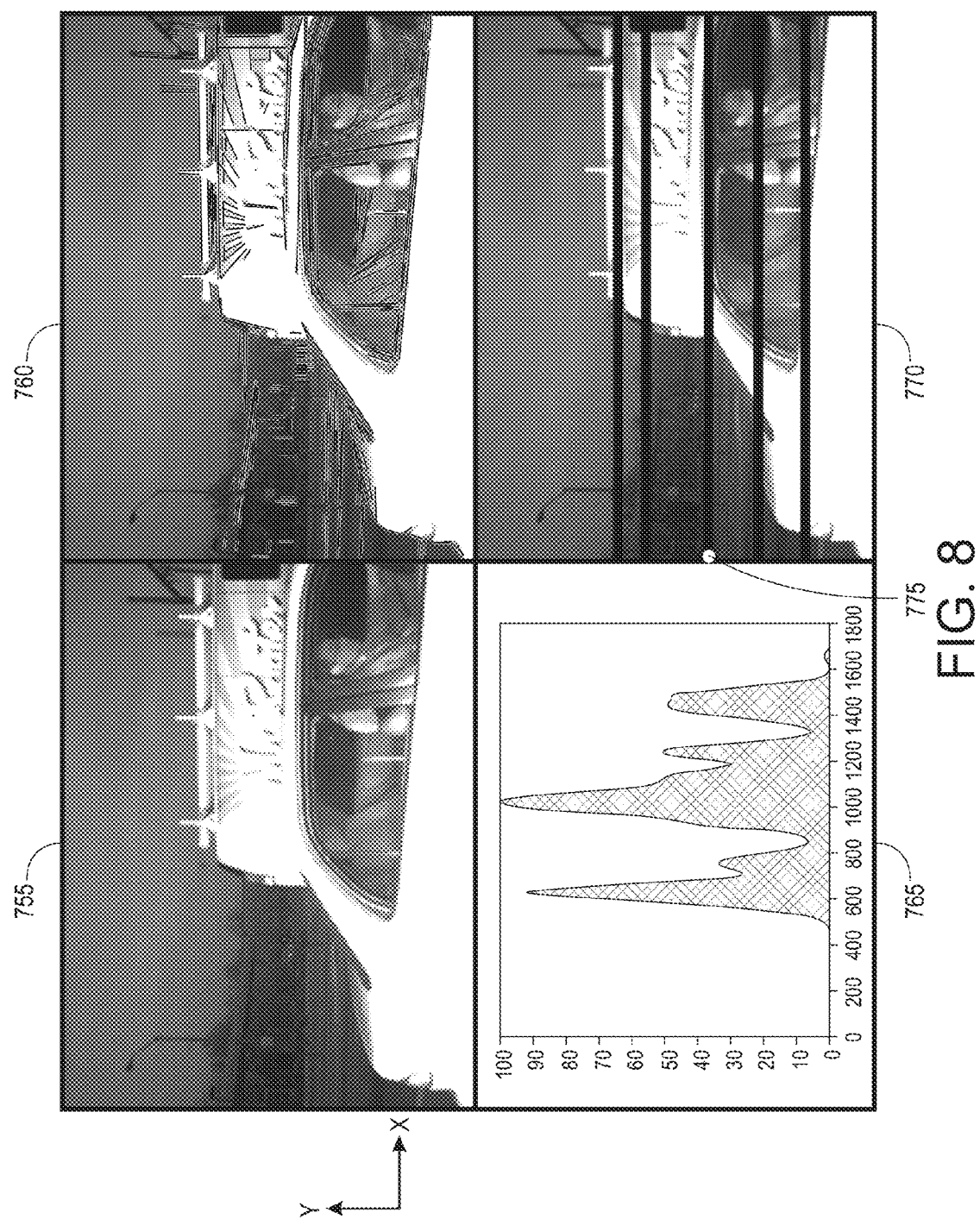
FIGS. 8-10 illustrates a visual representation of local self similarity (LSS) distance computation, in accordance with the disclosed embodiments.

FIG. 8 illustrates a side-view image 755 captured by the side-view image capturing unit, a long line detection overlaid on the original side-view image 760, a histogram of the sum of the pixels along X-axis 765, and a line 775 (shown on left side of the figure) corresponds to the longest line 770. For example, the image derivatives can be computed followed by the non-maximum suppression utilizing a canny edge detector. Next, a line on the gradient image can be fitted. The gradient direction can be quantized into a set of k ranges, where all the pixels having an orientation within a certain range fall into a corresponding bin and are assigned a particular label.

The edge pixels having the same label can be connected via connected components analysis algorithm. The connected components with length above a certain threshold (in terms of pixels) can be considered. Next, the binary line image in the X direction can be summed as shown in images 755 and 760, and a low pass filtering of the one dimensional line sum image can be performed as shown image 765. The image 770 shows the location of long lines, and the longest line (maximum point depicted in image 765) typically corresponds to upper/lower side of the side windows (shown with by arrow 775 in image 770), The regions around the longest line are considered for potential side-window detection.

Figure 9:
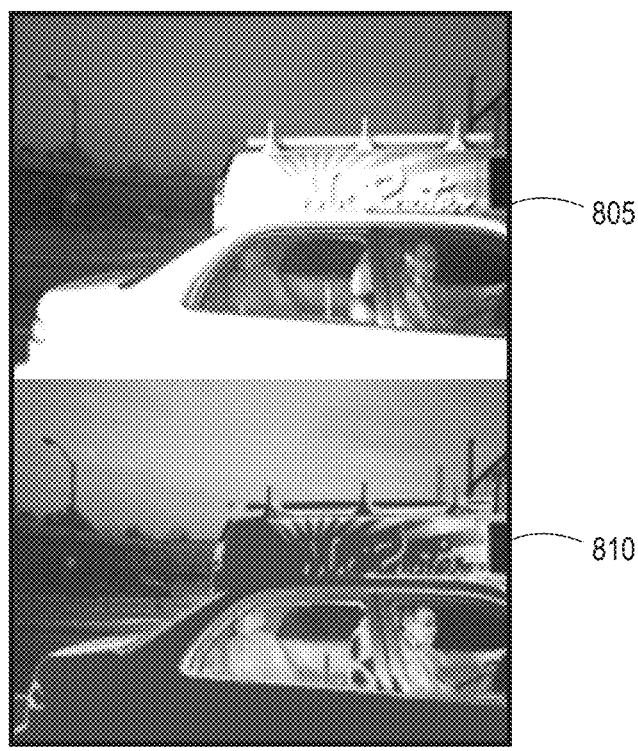

FIG. 9 illustrates an original side-view image 805 captured by the side-view image capturing unit and the superpixel image 810 (color coded) generated by the watershed algorithm. Superpixels are small, closed image segments that possess coherent region features and their boundaries are perpendicular to the image gradients. The superpixels can be derived by applying a watershed transform to the grayscale side view image. Superpixel with the highest number of elements below the longest line typically corresponds to the body of the vehicle. In order to reduce the false alarm rate, the body of the vehicle is not considered for side-window detection unless the detection confidence score is high. The image 810 corresponds to the superpixel map of the image 805.

Figure 10:
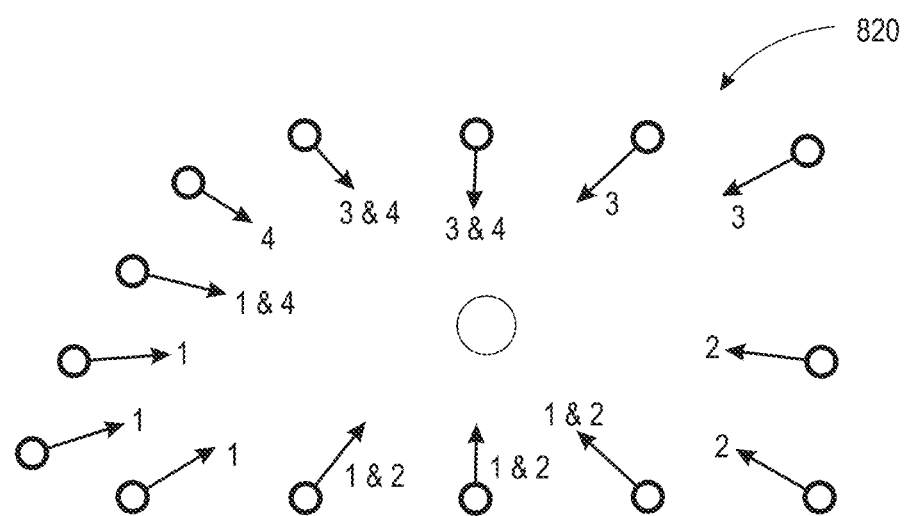
Figure 11:
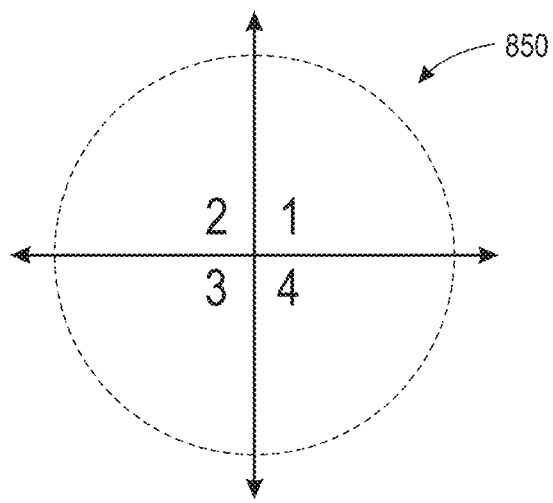
FIG. 11 illustrates an experimental result of running a side-window detection technique on a test image, in accordance with an alternative embodiment.
Figure 12:
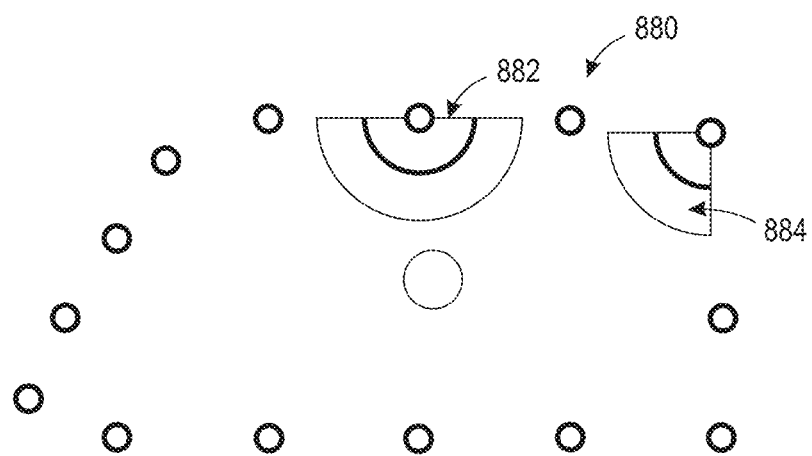
FIG. 12 illustrates an experimental result depicting significance of local self similarity operation, in accordance with an alternative embodiment.

FIGS. 10-12 illustrate a schematic representation of local self similarity (LSS) distance computation 820, 850, and 880, in accordance with the disclosed embodiments. Equation (1) includes two terms; local (part based) regional term and a shape term. The weighting term 390 can be incorporated to the inference equation (1) in order to remove homogenous false alarm regions. The weighting term 390 measures the local self similarity at every landmark point by correlating a local patch centered at landmark with a larger surrounding image region (e.g., of radius 60 pixels), as shown in FIG. 10. Next, sum of the chi-square distance between the histograms of the local (x) and larger regions (y) can be computed utilizing equation (5) as shown below:

$$Dist(x, y) = \frac{1}{2} \sum_i \frac{(x_i - y_i)^2}{(x_i + y_i)} \quad (5)$$

The weighting term 390 can be incorporated into the deformable part model 375 (DFM) inference as shown below in equation (6) or it can be employed as a post processing step utilizing detected landmark points.

$$S*(I) = \max_m \left[ \max_L S(I, L, m) \right] * Dist(I, L, m). \quad (6)$$

The local self similarity processing module 385 further eliminates false alarms due to strong edge points. For each landmark point shown in FIG. 10, two histograms along the quadrant depicted in FIG. 11 can be computed. Local region 882 has a radius of 15 pixels and region 884 has a radius of 60 pixels. Chi-square distance can be easily computed from the histograms 850 and the chi-square distance for all land mark points can be summed.

Figure 13:
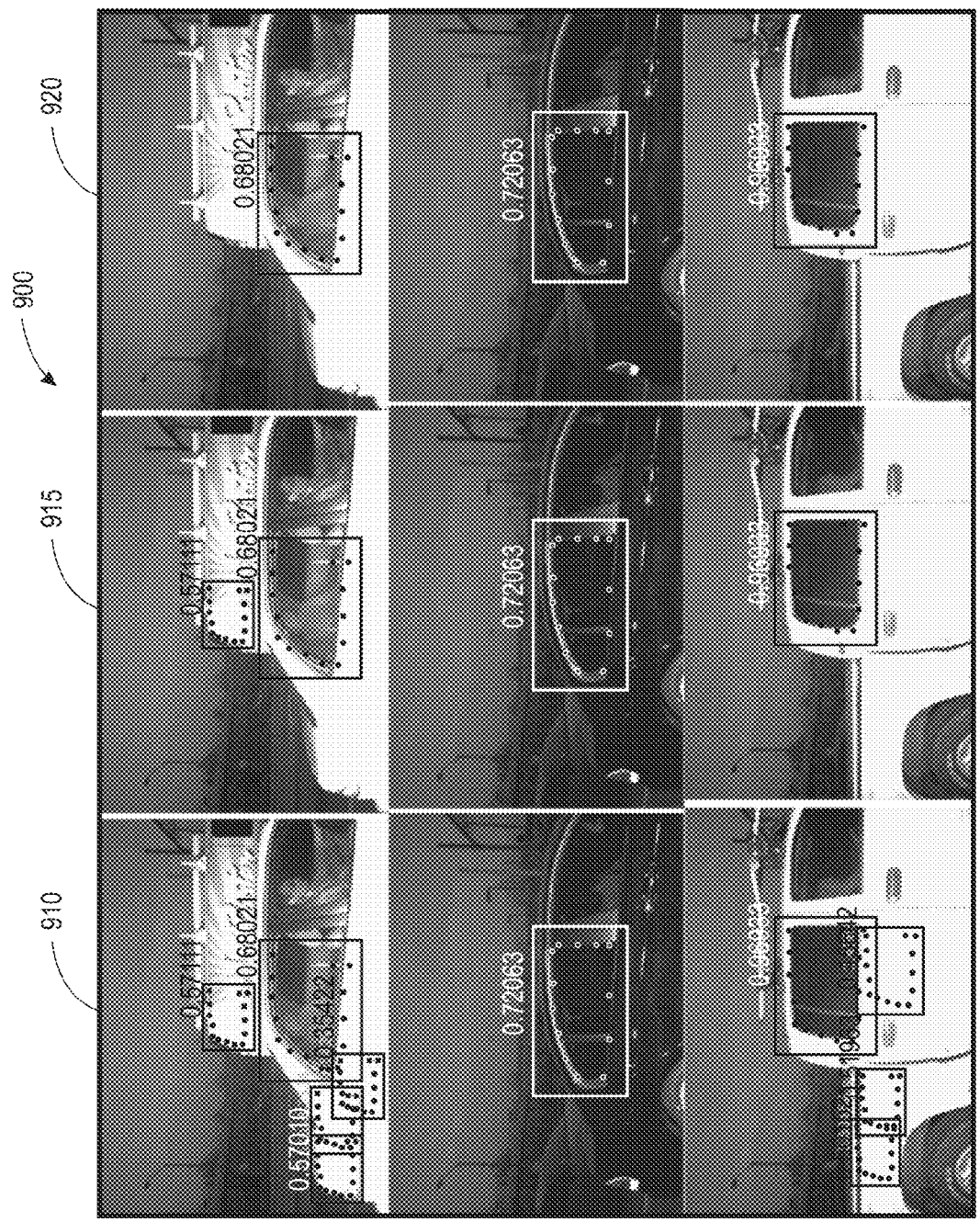
FIG. 13 illustrates an experimental result of running a side-window detection technique on a test image, in accordance with an alternative embodiment.

FIG. 13 illustrates images indicative of the experimental result of running a side-window detection technique on a test image, in accordance with an alternative embodiment. The advantage of using the respective superpixel and longest line detection modules 350 and 345 can be clearly seen in FIG. 13 by the reduction in false alarms rates of images 915 and 920. Note that the refined DFM 370 eliminates some of the false alarms, but not the ones due to strong edges. The image 910 shown in FIG. 13 illustrates objects found using the method 400 discussed earlier herein. The image 915 indicates objects found by incorporating superpixel and long line detection techniques into the deformable part model 375. The image 920 denotes the objects found by incorporating superpixel, long line detection, and local self similarity techniques into the deformable part model 375.

The performance of the side-window detection system 300 can be evaluated utilizing accuracy, sensitivity (detection rate), and specificity (e.g., 1-miss rate) performance metrics. Table 1 below lists data indicative of the performance of the side-window detection system 300 as well as original deformable part model 375 and refined DFM model 370 for 90 sample images. Ground truth for these images can be obtained manually by outlining the side-window region in the images. The system 300 can achieve a 5% decrease in false alarm rates while achieving the same detection performance as others.

TABLE 1

| Method | Metric | | |
| --- | --- | --- | --- |
|  | Accuracy | Sensitivity | Specificity |
| Side-Window Detection | 0.9347 | 0.9030 | 0.9372 |
| Refined DFM | 0.9745 | 0.9030 | 0.9800 |
| Original DFM | 0.9760 | 0.9030 | 0.9814 |

Figure 14:
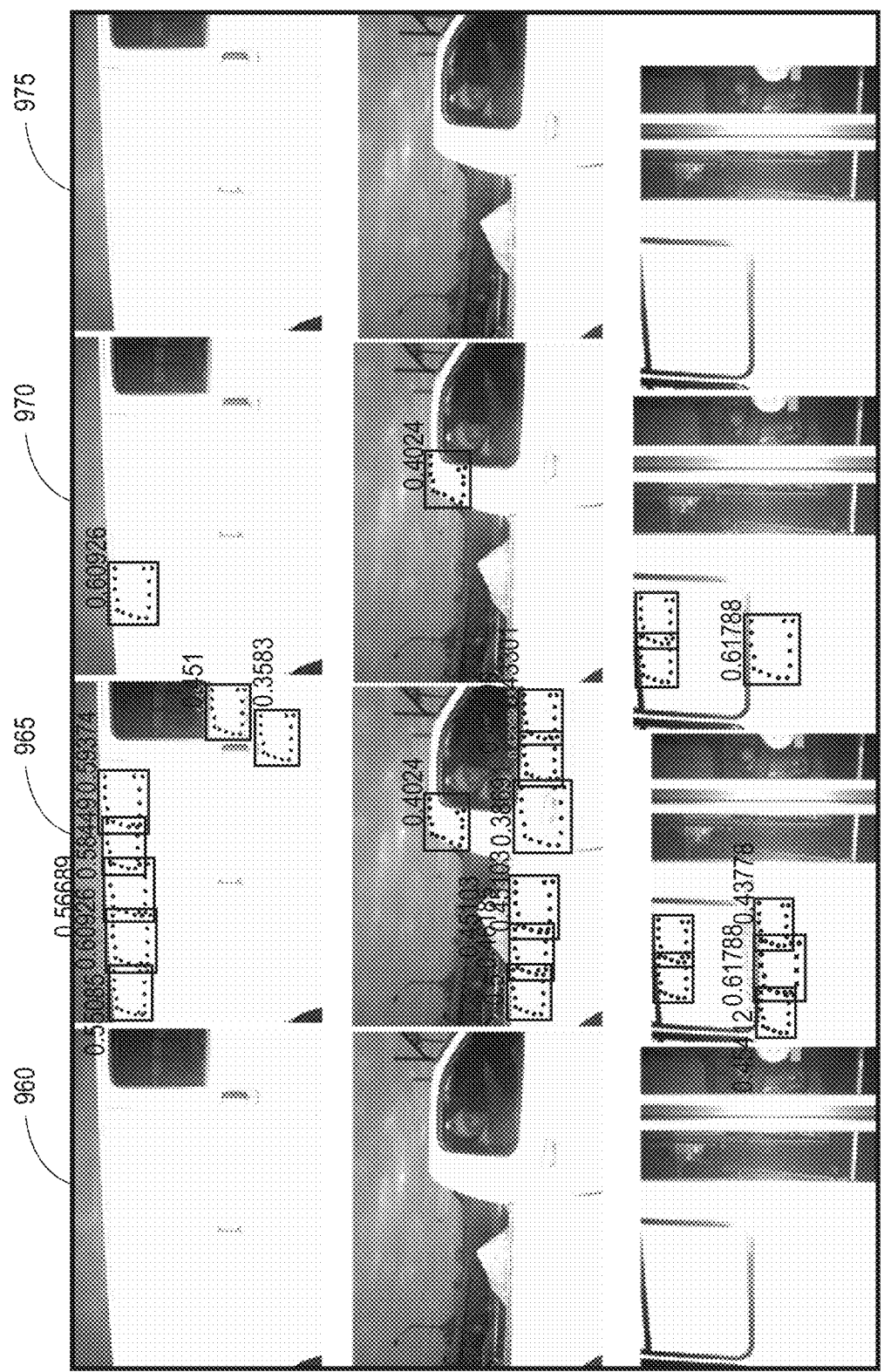
FIG. 14 illustrates an experimental result and significance of the local self similarity operation, in accordance with an alternative embodiment.

FIG. 14 illustrates images depicting the experimental result and significance of the LSS operation, in accordance with an alternative embodiment. Due to the presence of a strong edge point, the refined DFM 370 may make erroneous decisions, while the system 300 can remove false alarms utilizing global regional information 355. An original image is shown in FIG. 14 as image 960. Image 965 depicts objects found utilizing the method 400 discussed earlier herein. The image 970 indicates the objects found by incorporating the respective superpixel and long line detection 350 and 345 into the deformable part model 375. The image 975 denotes objects identified by incorporating and implementing the superpixel, long line detection, and local self-similarity modules 350, 345, and 385 into the deformable part model 375.

Based on the foregoing, it can be appreciated that a number of embodiments are disclosed herein, preferred and alternative. For example, in a preferred embodiment, a side window detection method can be implemented, which can include the steps or logical operations of, for example, generating a deformable part model with respect to an image of a vehicle captured in a near-infrared band utilizing a side window detection and a B-frame detection module in order to obtain a set of candidate side-windows; generating a refined deformable part model utilizing a super pixel generation and a longest-line detection in order to remove a false alarm with respect to the deformable part model; and refining the detection performance of the refined deformable part model based on global regional information utilizing a local self-similarity based metric.

In some embodiments, a step or logical operation can be implemented for identifying a spatial feature associated with presence of an occupant by the side window detection and a B-frame detection module. In yet another embodiment, a step or logical operation can be implemented for encoding an elastic deformation and 3D structure of an object for a face detection and pose estimation; modeling a topological change due to a view point utilizing a mixture of trees with a shared pool of part defined at each landmark position and a global mixture wherein the global mixture captures a gross deformation change for a single viewpoint; and considering the model as a linear classifier, which generates a face detection score, for example, the image region and assigning a highest score as a face region.

In yet another embodiment, a step or logical operation can be provided for globally optimizing the side window detection with dynamic programming while still capturing and/or detection, for example, a backseat side window boundary utilizing a B-pillar. In other embodiments, steps or logical operations can be implemented for computing an image derivative followed by a non-maximum suppression utilizing a canny edge detector and fitting a line on a gradient image; quantizing a gradient direction into a set of ranges, where all pixels having an orientation within a certain range fall into a corresponding bin and assigned a particular label; and connecting an edge pixel having similar label via a connected component analysis algorithm with length above a certain threshold.

In still other embodiments, steps or logical operations can be provided for summing a binary line image in X direction and performing a low pass filtering of one dimensional line sum image; and employing a longest line in the image that corresponds to upper/lower side of the side window for potential side-window detection. In another embodiment, the aforementioned superpixel generation can be implemented by deriving a superpixel by applying a watershed transform to a grayscale side view image wherein the superpixel with a highest number of elements below the longest line typically corresponds to a body of the vehicle. In another embodiment, the body of the vehicle is not considered for the side-window detection unless the face detection score is high in order to reduce a false alarm rate.

In still other embodiments, steps or logical operations can be provided for adding a weighting term to the face detection score in order to remove a homogenous false alarm region; measuring a local self similarity at every landmark point by correlating a local patch centered at landmark with a larger surrounding image region by the weighting term; and computing a sum of chi-square distance between a histogram of a local and larger region and incorporating the weighting term into the deformable part model inference and employing as a post-processing step utilizing a detected landmark point. In another embodiment, the local self similarity processing can further eliminate the false alarm due to a strong edge point.

In another embodiment, for example, a side window detection system can be implemented. Such a system can include, for example, a processor; a data bus coupled to the processor; and a computer-usable medium embodying computer program code, the computer-usable medium being coupled to the data bus. Such computer program code can include instructions executable by the processor and configured for: generating deformable part model with respect to an image of a vehicle captured in a near-infrared band utilizing a side window detection and a B-frame detection module in order to obtain a set of candidate side-windows; generating a refined deformable part model utilizing a super pixel generation and a longest-line detection in order to remove a false alarm with respect to the deformable part model; and refining the detection performance of the refined deformable part model based on global regional information utilizing a local self-similarity based metric.

In yet another embodiment, a processor-readable medium storing computer code representing instructions to cause a process of side window detection can be implemented. Such computer code can include code to, for example: generate a deformable part model with respect to an image of a vehicle captured in a near-infrared band utilizing a side window detection and a B-frame detection module in order to obtain a set of candidate side-windows; generate a refined deformable part model utilizing a super pixel generation and a longest-line detection in order to remove a false alarm with respect to the deformable part model; and refine the detection performance of the refined deformable part model based on global regional information utilizing a local self-similarity based metric.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A side window detection method, comprising:
    generating a deformable part model with respect to an image of a vehicle captured in a near-infrared band utilizing a side window detection and a B-frame detection module in order to obtain a set of candidate side-windows;
    generating a refined deformable part model utilizing super pixel generation and a longest-line detection in order to remove a false alarm with respect to said deformable part model; and
    refining detection performance of said refined deformable part model based on global regional information utilizing a local self-similarity based metric.

2. The method of claim 1 further comprising identifying a spatial feature associated with presence of an occupant by said side window detection and B-frame detection module.

3. The method of claim 1 further comprising:
    encoding an elastic deformation and 3D structure of an object for face detection and pose estimation;
    modeling a topological change due to a view point utilizing a mixture of trees with a shared pool of parts defined at each landmark position and a global mixture wherein said global mixture captures a gross deformation change for a single viewpoint; and
    considering said refined deformable part model as a linear classifier, which generates a face detection score for an image region and assigning a highest score as a face region.

4. The method of claim 1 further comprising globally optimizing said side window detection with dynamic programming and still capture to detect a backseat side window boundary utilizing a B-pillar.

5. The method of claim 1 wherein said longest line detection further comprises:
   computing an image derivative followed by a non-maximum suppression utilizing a canny edge detector and filling a line on a gradient image;
   quantizing a gradient direction into a set of ranges, where all pixels having an orientation within a certain range fall into a corresponding bin and are assigned a particular label; and
   connecting an edge pixel having a similar label via a connected component analysis algorithm with length above a certain threshold.

6. The method of claim 5 further comprising:
   summing a binary line image in X direction and performing a low pass filtering of one dimensional line sum image; and
   employing a longest line in said image of said vehicle that corresponds to a upper/lower side of a side window for potential side-window detection.

7. The method of claim 1 wherein said super pixel generation further comprises:
   deriving a superpixel by applying a watershed transform to a grayscale side view image wherein said superpixel with a highest number of elements below a longest line typically corresponds to a body of said vehicle.

8. The method of claim 7 further comprising wherein said body of said vehicle is not considered for said side-window detection unless face detection score is high in order to reduce a false alarm rate.

9. The method of claim 1 wherein local self similarity processing further comprises:
   adding a weighting term to a face detection score in order to remove a homogenous false alarm region;
   measuring a local self similarity at every landmark point by correlating a local patch centered at landmark with a larger surrounding image region by said weighting term; and
   computing a sum of chi-square distance between a histogram of a local and larger region and incorporating said weighting term into said deformable part model and employing a post-processing step utilizing a detected landmark point.

10. The method of claim 9 wherein said local self similarity processing further eliminates a false alarm due to a strong edge point.

11. A side window detection system, comprising:
   a processor;
   a data bus coupled to said processor; and
   a computer-usable medium embodying computer program code, said computer-usable medium being coupled to said data bus, said computer program code comprising instructions executable by said processor and configured for:
      generating a deformable part model with respect to an image of a vehicle captured in a near-infrared band utilizing a side window detection and a B-frame detection module in order to obtain a set of candidate side-windows;
      generating a refined deformable part model utilizing superpixel generation and a longest-line detection in order to remove a false alarm with respect to said deformable part model; and
      refining detection performance of said refined deformable part model based on global regional information utilizing a local self-similarity based metric.

12. The system of claim 11 wherein said instructions are further configured for identifying a spatial feature associated with presence of an occupant by said side window detection and B-frame detection module.

13. The system of claim 11 wherein said instructions are further configured for:
   encoding an elastic deformation and 3D structure of an object for face detection and pose estimation;
   modeling a topological change due to a view point utilizing a mixture of trees with a shared pool of parts defined at each landmark position and a global mixture wherein said global mixture captures a gross deformation change for a single viewpoint; and
   considering said refined deformable part model as a linear classifier, which generates a face detection score for an image region and assigning a highest score as a face region.

14. The system of claim 11 wherein said instructions are further configured for globally optimizing said side window detection with dynamic programming and still capture to detect a backseat side window boundary utilizing a B-pillar.

15. The system of claim 11 wherein said instructions are further configured for:
   computing an image derivative followed by a non-maximum suppression utilizing a canny edge detector and fitting a line on a gradient image;
   quantizing a gradient direction into a set of ranges; where all pixels having an orientation within a certain range fall into a corresponding bin and are assigned a particular label; and
   connecting an edge pixel having a similar label via a connected component analysis algorithm with length above a certain threshold.

16. The system of claim 15 wherein said instructions are further configured for:
   summing a binary line image in X direction and performing a low pass filtering of one dimensional line sum image; and
   employing a longest line in said image of said vehicle that corresponds to a upper/lower side of a side window for potential side-window detection.

17. The system of claim 11 wherein said superpixel generation further comprises:
   deriving a superpixel by applying a watershed transform to a grayscale side view image wherein said superpixel with a highest number of elements below a longest line typically corresponds to a body of said vehicle.

18. The system of claim 11 wherein said instructions are further configured for:
   adding a weighting term to a face detection score in order to remove a homogenous false alarm region;
   measuring a local self similarity at every landmark point by correlating a local patch centered at landmark with a larger surrounding image region by said weighting term; and
   computing a sum of chi-square distance between a histogram of a local and larger region and incorporating said weighting term into said deformable part model and employing a post-processing step utilizing a detected landmark point.

19. A non-transitory processor-readable medium storing computer representing instructions, when executed by a processor cause a process of side window detection, said computer code comprising code to:
   generate a deformable part model with respect to an image of a vehicle captured in a near-infrared band utilizing a side window detection and a B-frame detection module in order to obtain a set of candidate side-windows;

generate a refined deformable part model utilizing superpixel generation and a longest-line detection in order to remove a false alarm with respect to said deformable part model; and refine detection performance of said refined deformable part model based on global regional information utilizing a local self-similarity based metric.

20. The non-transitory processor-readable medium of claim 19 wherein said code further comprises code to identify a spatial feature associated with a presence of an occupant.

* * * * *